United States Patent [19]

Okamura et al.

[11] Patent Number: 5,600,796
[45] Date of Patent: Feb. 4, 1997

[54] TOKEN RING FAULT RECOVERY SYSTEM FOR AUTOMATICALLY RESTORING NETWORK WHICH INCLUDES A TRANSMIT POSSIBLE AND RECEIVE IMPOSSIBLE TOKEN HOLDING STATION

[75] Inventors: Naoki Okamura, Nara; Noriyuki Takao; Hidetoshi Takano, both of Toyota, all of Japan

[73] Assignees: Toyota Jidosha Kabushiki Kaisha, Toyota; Sharp Kabushiki Kaisha, Osaka, both of Japan

[21] Appl. No.: 247,207

[22] Filed: May 20, 1994

[30] Foreign Application Priority Data

May 21, 1993 [JP] Japan .................................. 5-120019

[51] Int. Cl.[6] .............................. G06F 7/00; G06F 15/00
[52] U.S. Cl. ............................... 395/200.11; 395/200.15; 395/181; 395/183.08; 395/184.01; 370/452; 364/241.8; 364/242.94; 364/242.96; 364/DIG. 1; 364/935.51; 364/940.6
[58] Field of Search .................................. 395/800, 200, 395/200.11, 200.15, 181, 183.08, 184.01; 370/85.4, 85.5; 340/825.5; 364/DIG. 1, DIG. 2

[56] References Cited

U.S. PATENT DOCUMENTS

| | | | |
|---|---|---|---|
| 4,604,742 | 8/1986 | Hamada et al. ........................ | 370/85.4 |
| 4,661,902 | 4/1987 | Hochsprung et al. ................... | 395/200 |
| 4,663,748 | 5/1987 | Karbowiak et al. .................... | 370/85.4 |
| 4,707,830 | 11/1987 | Ulug ....................................... | 370/85.4 |
| 5,012,468 | 4/1991 | Siegel et al. ........................... | 370/85.5 |
| 5,077,732 | 12/1991 | Fischer et al. ......................... | 370/85.4 |
| 5,414,700 | 5/1995 | Yang et al. ............................. | 370/24 |

FOREIGN PATENT DOCUMENTS

| | | |
|---|---|---|
| 0196911 | 10/1986 | European Pat. Off. . |
| 0435037 | 7/1991 | European Pat. Off. . |

OTHER PUBLICATIONS

IEEE International Conference on Communications, Boston, US, pp. 608–613, B. Jabbari et al.: *A token–passing data associated protocol for local computer networks.*
Token–Passing Bus, ISO/IEC 8802.4: 1990, ieee sTD 802.4–1990, pp. 111, 118–119, 122–123, 126–127, 130.

*Primary Examiner*—Meng-Ai T. An
*Attorney, Agent, or Firm*—Kenyon & Kenyon

[57] ABSTRACT

A communication network is comprised of several stations that constitute a logical ring to transmit and receive information. The logical ring is established and maintained by a token passing process and a solicit process. The token represents the right to transmit information between the stations in the logical ring. The solicit process solicits stations that are not in the logical ring. The stations in the network include at least one particular station. Each of the stations as well as the particular station include soliciting capability for carrying out the solicit process when holding a token. In addition, each station except for the particular station also includes first solicit repeat capability for repeating the solicit process at most a predetermined number of times when no frame arrives from other stations in the network, and the function of moving to an idle state when no frames arrives from other stations after the solicit process is repeated. The particular station further includes second solicit repeat capability for repeating the solicit process when no frame arrives from any station in the network in response to the solicit process executed by the particular station, and token producing capability for producing the token when no other station joins in the logical ring.

2 Claims, 18 Drawing Sheets

Fig. 6A solicit_successor_1
Fig. 6B solicit_successor_2

TOKEN RING FAULT RECOVERY SYSTEM FOR AUTOMATICALLY RESTORING NETWORK WHICH INCLUDES A TRANSMIT POSSIBLE AND RECEIVE IMPOSSIBLE TOKEN HOLDING STATION

BACKGROUND OF THE INVENTION a) Field of the Invention:

The present invention relates to a communication network for carrying out communication while establishing and maintaining a logical ring by a solicit process.

b) Description of the Related Arts:

In FIG. 1, there is shown one example of a conventional communication network. In this network, four stations having station codes 00 to 03 are linked via a bus 10. In this case, one example of a practicable protocol is token passing which is, for example, defined by the IEEE standard 802.4.

In the token passing protocol, establishment and maintenance of a logical ring are essential. The logical ring is a ring composed of stations participating in transmitting and receiving data. In FIG. 1, a logical ring 12 is shown by a broken line and a token is transmitted from a station with a larger station code to one with a smaller one on the logical ring 12. Each station possesses information TS, PS and NS for representing its own station, a previous station and a next station, respectively. For example, the station 01 has information TS=01, PS=02 and NS=00.

In the token passing protocol, a transmission right of information is called a token. After obtaining the token, the station transmits a solicit frame to other stations when the number of the tokens obtained reaches a predetermined value by counting from the previous transmission of the solicit frame. The IEEE 802.4 defines a solicit _any as the solicit frame. The solicit _any is sent From a token hold station (the station holding the token) to all the other stations. Of the stations having received the solicit _any, any station capable of responding does so. The token hold station determines a new next station which responded to the solicit _any, is positioned in a token rotation direction along the logical ring, and has the station code closest to the token hold station. The token hold station transmits the token to this new next station. As a result, the station which responded to the solicit _any joins the logical ring 12. In transmitting the token, for example, if the token is broken down on the bus 10 by noise or the like, since the next station cannot receive the token, the token is sent again. That is, the token is repeatedly transmitted within the limits of a predetermined number.

When no station responds to the solicit _any, the token hold station considers that the logical ring 12 is composed of only its own station now and operates as follows. That is, after a bus _idle_timer expires, the token hold station sends a claim _token a predetermined number of times to the other stations. The claim _token is a frame claiming the token. After transmitting the claim _token a predetermined number of times, the station having transmitted the claim _token produces the token. Through a check on an access class the station having produced the token transmits the solicit _any again. When no response against the solicit _any is made, the claim _token transmit station deems that the network condition is a sole_active_station, that is, only its own station participates in the communication and it stops the solicitation. This station proceeds to an idle state (awaiting a call or address to its own station) and thereafter awaits receipt of an effective call from another station.

Hence, for example, even in a case where the next station fails into a state that the station cannot receive the token because of power off or the like, the token hold station recognizes this situation by sending the token again to execute the solicitation of another station, enabling the maintaining of the logical ring 12.

However, when a problem occurs in the token hold station and it falls into a transmit-possible and receive-impossible state, conventionally, the whole network is driven into a transmit-receive operation stop.

When falling into the transmit-possible and receive-impossible state, the token hold station cannot receive any responses from the other stations to the solicitation. Hence, this station carries out an operation as if no station responds to the solicit _any. As a result of this operation, the token hold station moves to the idle state. However, since the token hold station cannot receive any transmission from the other stations, the token hold station cannot return to the communication state. Further, the other stations except the token hold station are cut off from the transmission of the token and proceed to the idle state by a count-up or the like of a timer. Accordingly, the whole network becomes quiet. In order to restore communication from this state, it is necessary to initialize the stations except the faulty one and thus a manual operation is required.

SUMMARY OF THE INVENTION

It is therefore an object of the present invention to provide a communication network in view of the above-described problems of the prior art, which is capable of removing a token hold station which has fallen into a transmit-possible and receive-impossible state from a logical ring and automatically restoring a network operation.

It is another object of the present invention to provide a communication method which is capable of removing a token hold station which has fallen into a transmit-possible and receive-impossible state from a logical ring and automatically restoring a network operation.

In order to achieve the objects of the present invention, a communication network including a plurality of stations which constitute a logical ring to transmit and receive information, the logical ring being established and maintained by a token passing process to pass the token, representing the right to transmit information, between the stations in the logical ring and a solicit process to solicit stations which are not in the logical ring, and the stations in the network including at least one particular station.

A) each of the stations as well as the particular station, comprising:

A1) solicit means for carrying out the solicit process when holding a token;

A2) solicit response means for transmitting a frame to respond to the solicit process carried out by any station in the network; and A3) token transmit means for transmitting the token to the station having transmitted a frame to respond to the solicit process, when holding the token;

B) each station except for the particular station further comprising:

B1) first solicit repeat means for repeating the solicit process at most a predetermined number of times when no frame arrives from other stations in the network to respond to the solicit process, when holding the token;

B2) idle state move means for considering that no other stations join in the logical ring when no frame to respond to the solicit process arrives until the solicit process is repeated for the predetermined number of times, and for moving to an idle state to await the arrival of a frame from any station in the network; and B3) return means for resuming a predetermined operation from the idle state by responding to an effective frame arriving from any station in the network;

C) the particular station further comprising:

C1) second solicit repeat means for repeating the solicit process when no frame arrives from any station in the network in response to the solicit process executed by the particular station; and C2) token producing means for producing the token when no other station joins in the logical ring.

Further, a communication method for carrying out communication among a plurality of stations joining in a logical ring which is established and maintained by a token passing process to pass the token, representing the right to transmit information, between the stations in the logical ring and a solicit process to solicit stations which are not in the logical ring, the communication method comprises:

a) a solicit step for letting the solicit process be carried out by a station which is currently holding the token;

b) a solicit response step for transmitting a frame from another station to the current token-hold station;

c) a token transmit step for transmitting a token from the current token-holding station to said another station when the current token-holding station receives the frame in response to the solicit process carried out thereby;

d) a first solicit repeat step for enabling the current token-holding station to repeat the solicit process at most a predetermined number of times when the current token-holding station cannot receive a frame from any station in the network in response to the solicit process carried out by the current token-holding station which is not the particular station;

e) idle state move step for considering that no other stations join in the logical ring when no frame arrives to respond to the solicit process carried out by the current token-holding station other than the particular station until the solicit process is repeated for the predetermined number of times, and for moving to an idle state to await the arrival of a frame from any station responsive to the solicit process;

f) a return step for responding to an effective frame arriving from any station in the network and for enabling the station, which is the token holding station but not the particular station, to resume a predetermined operation;

g) a second solicit repeat step for repeating the solicit process when the particular station is currently holding the token and when no frame arrives from any station in the network in response to the solicit process; and h) a token producing step for permitting the particular station to produce the token when no other station joins in the logical ring.

According to the present invention, the token hold station executes the solicit process against other stations. If it is possible to respond, the station which received the solicit frame will do so. When receiving the response against the solicit frame, the station which executed the solicit process transmits the token to the station which responded. In contrast, when not receiving the response against the solicit frame, the station (except the particular station) which executed the solicit process repeatedly carries out the solicit process at most a predetermined number of times. Although the solicit process is repeatedly executed at most the predetermined number of times, when the response against the solicit frame of its own executing cannot be received, that station considers that none of the other stations join in the logical ring and moves to the idle state for awaiting the transmission directed to its own station. When the token hold station moves to the idle state in this manner, the above particular station considers that none of the other stations join in the communication and produces the token by the claim _token or the like. With obtaining the token, the above particular station executes the solicit process against other stations. The station in the idle state receives the solicit frame from the particular station and responds to this to start the predetermined operation. In this case, in the case where the station which executed the solicit process is the particular station, the solicit process is not stopped by the predetermined number of times and thereafter the solicitation against other stations continues.

Hence, in the case where the token hold station (except the particular station) falls into a transmit-possible and receive-impossible state, even when the response against the solicit process of its own executing is sent from another station, the token hold station cannot receive it and thus finally moves to the idle state. However, when none of other stations join in the communication, the particular station produces the token to start the communication and hence the network automatically returns to the communication state. Further, the station falling into the transmit-possible and receive-impossible state cannot receive the effective transmission and thus cannot return from the idle state. Therefore, the faulty station can also be specified and removed from the logical ring.

As described above, according to the present invention, although the stations, except a particular station, repeatedly execute the solicit process up to a predetermined number of times, when the station cannot receive any response against the solicit process of its own executing, the station moves to the idle state for awaiting the transmission directed to itself. Further, even when none of other stations join in the communication, the particular station can produce the token by itself and execute the solicit process. Hence, when the token hold stations, except the particular station, fall into the transmit-possible and receive-impossible state, the particular station can produce the token and establish the logical ring again and hence the network can automatically return to the communication state. Further, the station falling into the transmit-possible and receive-impossible state cannot return from the idle state. Hence, the faulty can be effectively specified and the troubled station can be readily removed from the logical ring.

BRIEF DESCRIPTION OF THE DRAWINGS

The objects, features and advantages of the present invention will become more apparent from the consideration of the following detailed description, taken in conjunction with the accompanying drawings, in which:

FIG. 2 is a flow chart of an initialization routine of an operation of a communication network according to the present invention, executed by each communication controller right after power on;

FIGS. 6A and 6B are schematic views showing a solicit _successor_1 and a solicit _successor_2 of a solicit _successor as a control frame of a MAC (medium-access control) layer used for a solicitation against other stations in the embodiment shown in FIG. 2;

DESCRIPTION OF THE PREFERRED EMBODIMENTS

Figure 1:
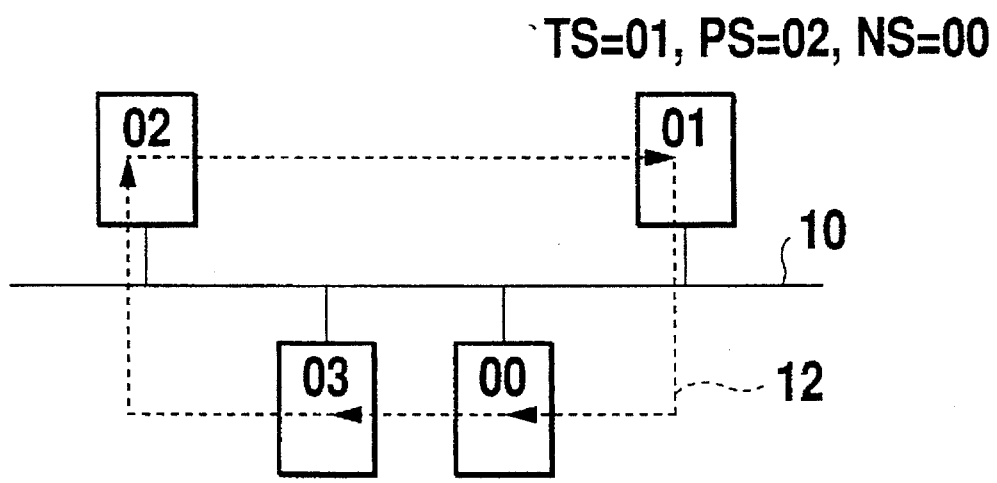
FIG. 1 is a block diagram of a conventional communication network employing a token passing protocol.

The present invention will now be described in connection with its preferred embodiments with reference to the accompanying drawings, wherein like reference characters designate like or corresponding parts throughout the views and thus the repeated description thereof can be omitted for brevity.

a) Operation of a communication controller of each station:

FIG. 2 to FIG. 5 illustrates a flow of an operation of a communication controller of each station in a communication network according to the present invention. The communication network has a construction in which a plurality of stations are linked via a bus 10 in the same manner as a conventional one shown in FIG. 1. In this embodiment, each of the stations constituting the communication network includes the communication controller (not shown). The communication controller controls communication to be executed with other stations via the bus 10. At this time, information is exchanged between application equipments. In a case where a system of this embodiment is used for information transmission in a production line, for example, controllers of various equipments arranged on the line correspond to the application equipments described above. A protocol adopted in this embodiment has a structure of a simplified layer model of an OSI (open system interconnection) model of MAP4. More specifically, this layer model has three layers such as an application layer, a data-link layer (an LLC (logical link control) layer and a MAC layer) and a physical layer.

Figure 2:
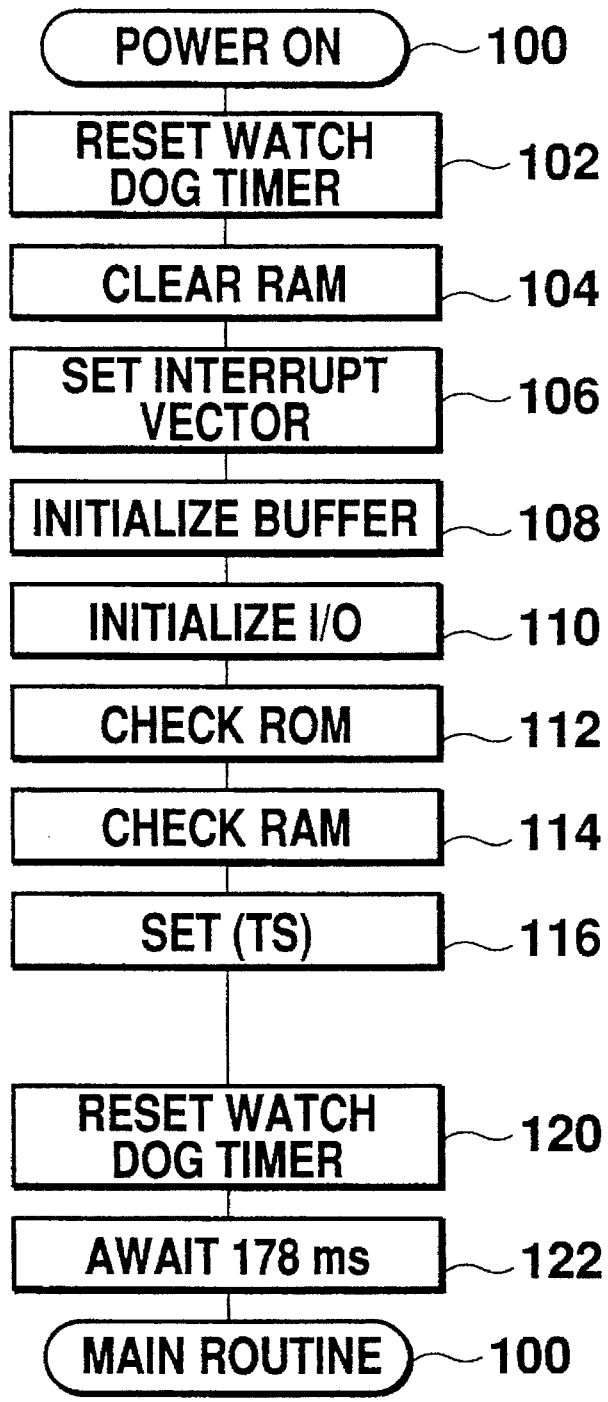

In this embodiment, the protocol is using the token passing in common with one defined in the IEEE 802.4. Hence, the present invention will now be described with reference to its preferred embodiments in conjunction with a network connection shown in FIG. 1.

a. 1) Initialization routine:

FIG. 2 shows an initialization routine to be executed right after power on in step 100. This routine exhibits an operation of a sub station in particular. In this routine, a watch dog timer reset in step 102, a RAM clear in step 104, an interruption vector setting in step 106, a buffer initialization in step 108, an I/O initialization in step 110, a ROM check in step 112, a RAM check in step 114 and a TS setting in step 116 are carried out, and after resetting the watch dog timer again in step 120, an operation of a communication controller proceeds to a main routine in step 124 via waiting for a predetermined time in step 122.

In this routine, the watch dog timer is a hardware timer for monitoring the runaway of a CPU. Each communication controller has various software timers in addition to the hardware timer such as the watch dog timer. On turning off the power, these timers are all reset. However, since electric charge remains in the hardware timer, particularly its capacitor, reset processing as shown in step 102 is required. In this case, the aforementioned CPU is one for controlling the operation of the station.

Figure 3:
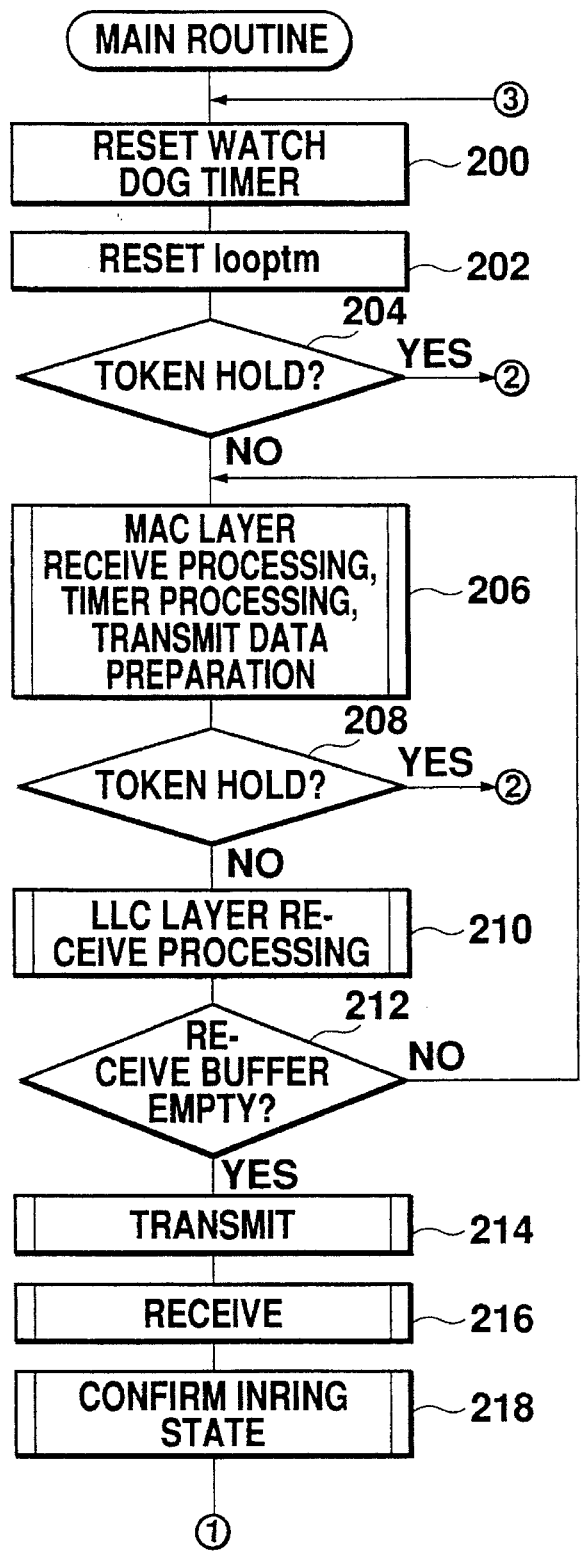
FIG. 3 is a flow chart of a part of a main routine executed by the communication controller in the embodiment shown in FIG. 2.
Figure 4:
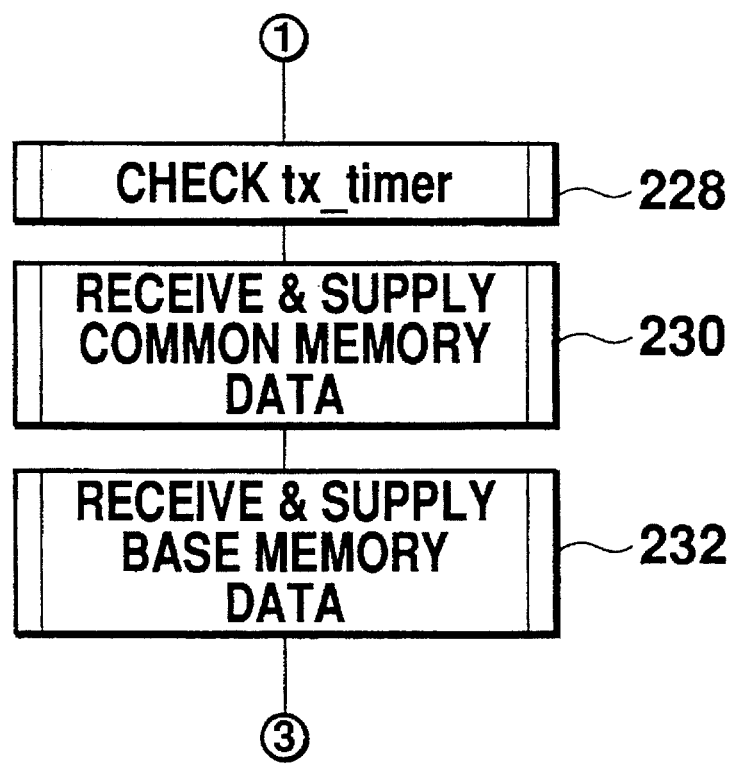
FIG. 4 is a flow chart of another part of the main routine executed by the communication controller in the embodiment shown in FIG. 2.
Figure 5:
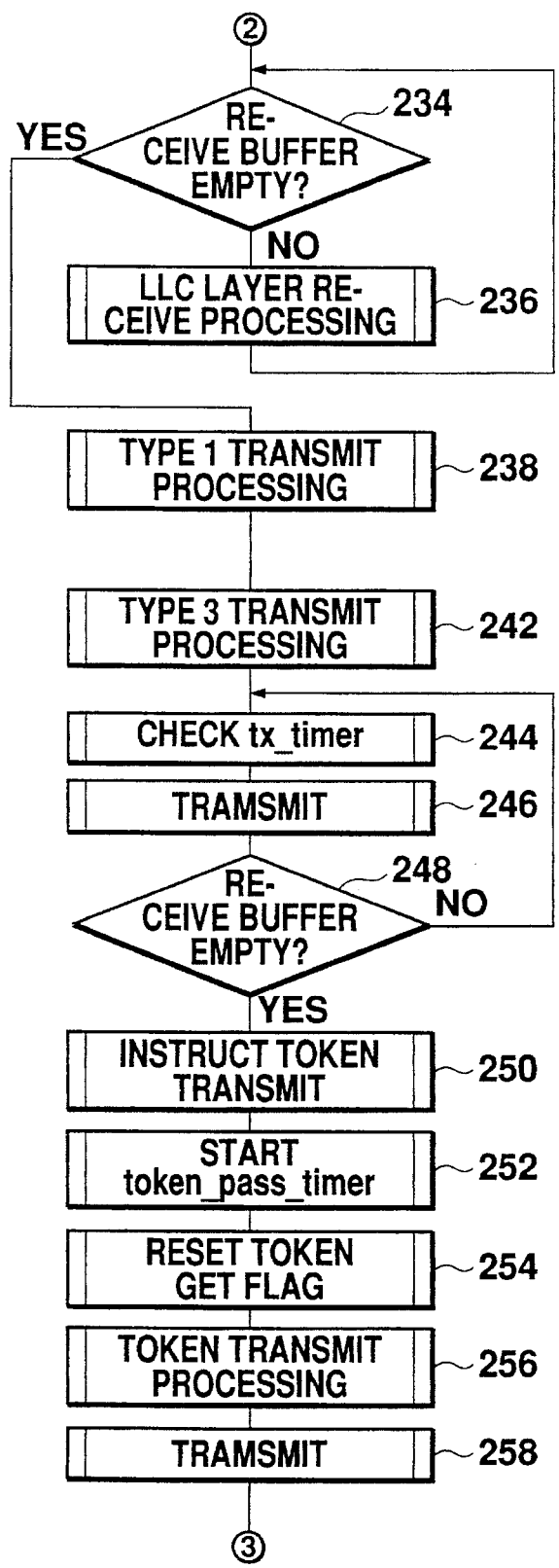
FIG. 5 is a flow chart of a further part of the main routine executed by the communication controller in the embodiment shown in FIG. 2.

Further, each station includes a RAM (not shown) for storing data which are supplied from the application equipment or are received via the bus 10, a buffer (not shown) for the bus 10, an I/O (not shown) for each application equipment, and a ROM (not shown) or the like for storing programs, constants or the like for the operation of the CPU or the like. Steps 104 and 108 to 114 are the operations required to put these in their usable states or to confirm whether these members can normally operate or not. Step 106 connects interrupts concerning a transmit and receive with respective processings to be executed. Step 116 is an initial setting of TS.

a. 2) Main routine:

FIG. 3 to FIG. 5 show a flow of a main routine. Just after finishing the initialization routine or executing step 232 or 258 described hereinafter, the watch dog timer is reset in step 200 and a variable looptm is then reset in step 202. The variable looptm is a software watch dog timer for monitoring the runaway of the main routine. Next, the communication controller discriminates whether or not its own station holds the token in step 204. When the station does not hold the token, the operation is moved to step 206, or when holding the token, to step 234.

In step 206, a MAC layer receive processing, a MAC layer timer processing, and a MAC layer transmit data preparation are carried out. In the MAC layer receive processing, when receiving a MAC control frame concerning a maintenance or the like of a logical ring 12, such as a token, a who _follows, a set _successor, a solicit _successor_1 or a solicit _successor_2, a receive processing is applied to the received frame. In the timer processing, timers regarding the MAC control frame such as a token_pass_ timer, a who _response_timer, a response_window_timer, a contention_timer and the like are set or reset. In the transmit data preparation, data to be transmitted to other stations as a response to the receive-processed MAC control frame are prepared.

The communication controller then discriminates whether or not its own station holds the token in step 208. When the station does not hold the token, the operation proceeds to step 234, or when holding the token, to step 210. In step 210, an LLC layer receive processing, that is, a receive processing of data as to the LLC layer (data used in the application equipment) is executed.

The processings in steps 206 to 210 are repeated until a buffer for receiving turns out empty, that is, the information received is all receive-processed. After the receive buffer becomes empty, the operation of the communication controller is then moved from step 212 to step 214. In next step 214, the data obtained in step 206 as the MAC control frame are transmitted. In next step 216, a frame transmitted from another station is received.

Next, the communication controller confirms a participation state in the logical ring 12 using an inring flag in step 218. The inring flag indicates that its own station participates in the logical ring 12. Besides confirming the inring flag state correct in step 218, the operation of the communication controller proceeds to step 228.

In step 228, a tx_timer is checked. The tx_timer can take a certain time by next receive after the transmission. In following step 230, the communication controller writes the data to be supplied to the application equipment on a common memory and simultaneously sets a flag on a base memory. When the flag stands on the base memory, an interface part (not shown) on the application equipment reads the data out of the common memory to supply the data to the application equipment. In the next step 232, the communication controller receives the transmit data supplied from the application equipment via the bus interface and writes the data into the base memory. In this case, the common memory and the base memory are positioned in a predetermined memory area on the RAM. After step 232, the operation of the communication controller is returned to step 200.

When it is discriminated that the station holds the token in step 204 or 208, the operation moves to step 234. In step 234, the communication controller discriminates whether or not the receive buffer is empty and performs the LLC layer receive processing until the receive buffer becomes empty in step 236. After emptying the receive buffer, the communication controller executes a TYPE1 transmit processing and a TYPE3 transmit processing in steps 238 to 242. The reason why there are two kinds of transmit processings of TYPE1 and TYPE3 is that there are various transmit types such as a simultaneous multi destination delivery, a one-to-one transmission and the like. After steps 238 to 242, the communication controller checks the tx_timer in step 244 and further executes a transmission in step 246. Moreover, at the time when the receive buffer becomes empty, that is, there is no data to be transmitted in step 248, the communication controller starts the transmission of the token in step 250. That is, the communication controller starts the token _pass_timer in step 252 and then successively executes a reset of a token get flag showing that its own station holds the token in step 254, a transmit processing about the token in step 256 and a transmission in step 258. The token _pass_timer is used for sending the token again, as described hereinafter. After step 258, the operation of the communication controller returns to step 200.

b) Basic operation of each station:

The basic operation of each station such as a token passing procedure and a solicit _successor procedure are realized in accordance with the aforementioned flow. The basic operation of earth station will now be described f-or every procedure and operations right after power on and upon fault occurrence will also be bedescribed.

b. 1) Solicit _successor procedure:

The solicit _successor procedure is carried out by the token hold station when the next station is unknown or when its own station and the next station are discontinuous. The former is the case where other stations are solicited for the participation into the logical ring 12 and the latter is the case where the participation of other stations into the logical ring 12 is confirmed.

The MAC control frame used in the solicit _successor procedure is the solicit _successor_1 and the solicit _successor_2. Both the solicit _successor_1 and solicit _successor_2 are the solicit frame to be transmitted by designating a range of stations to be answered and have a source address (SA) and a destination address (DA). The station for transmitting the solicit _successor_1 or the solicit _successor_2 sets its own TS in SA and also suitably sets DA before the transmission of the solicit _successor_1 or the solicit _successor_2. The stations capable of responding to the solicit _successor_1 or the solicit _successor_2 must have the station codes equal to between SA and DA. However, the stations having the codes equal to SA or DA cannot respond. The responding is carried out using the set _successor.

In this embodiment, the token is transmitted from the station having a larger station code to the station having a smaller one on the logical ring 12, and the next station of the station having a maximum code in the logical ring 12 is the station having a minimum code in the logical ring 12. On the other hand, since the solicit _successor procedure is performed for the solicitation of the station to be the next station or the confirmation of the next station, DA must position on the downstream side of SA. Hence, when its own station code is not minimum, it is necessary to use the solicit _successor which allows the stations in the range shown by a thick solid line in FIG. 6A to respond, and when minimum, stations in the range shown by thick solid lines in FIG. 6B. The reason why the two solicit _successor_1 and solicit _successor_2 as the solicit _successor are given is that there are two cases where DA is larger or smaller than SA. In FIG. 6A and FIG. 6B, it is assumed that 64 (40H) stations are present and the stations shown by ○ having the station code equal to SA or DA cannot respond to the solicit _successor.

When the joining of other stations in the logical ring 12 is solicited or confirmed by the solicit _successor_1 or the solicit _successor_2, with the transmission of the solicit _successor_1 or the solicit _successor_2, the token hold station starts the response_window_timer as a built-in software timer. Of the stations which received the solicit _successor_1 or the solicit _successor_2 transmitted, ones hoping to join in the logical ring 12 and locating in the range (between SA and DA, hereinafter referred to as "window") designated by the solicit _successor_1 and the solicit _successor_2 start the contention_timer in response to the receive of the solicit _successor_1 or the solicit _successor_2 and transmit the set _successor including their own station codes as data to the solicit _successor transmit stations after the contention_timer expires. The token hold station which transmitted the solicit _successor_1 or the solicit _successor_2, normally receives the set _successor directed to itself by the expiration of the response_window_timer. The token hold station restarts the response_window_timer and transmits the token to the station which sent the set _successor received when the response_window_timer expires. The contention_timer and the response_window_timer will be further explained later.

b. 1. 1) Solicit _successor procedure when a next station is unknown:

The solicit _successor procedure executed in a case where a next station is unknown is a procedure for soliciting stations hoping to join in the logical ring 12. For example, when failing in sending the token again, as described hereinafter, and further receiving no response to the who _follows, the token hold station considers that there is no station except itself participating in the logical ring 12, and solicits other stations to join in the logical ring 12. Further, as described hereinafter, right after the power is switched on, a main station obtains the token by repeating the transmission of the claim_token and then solicits other stations to join in the logical ring 12.

Figure 7:
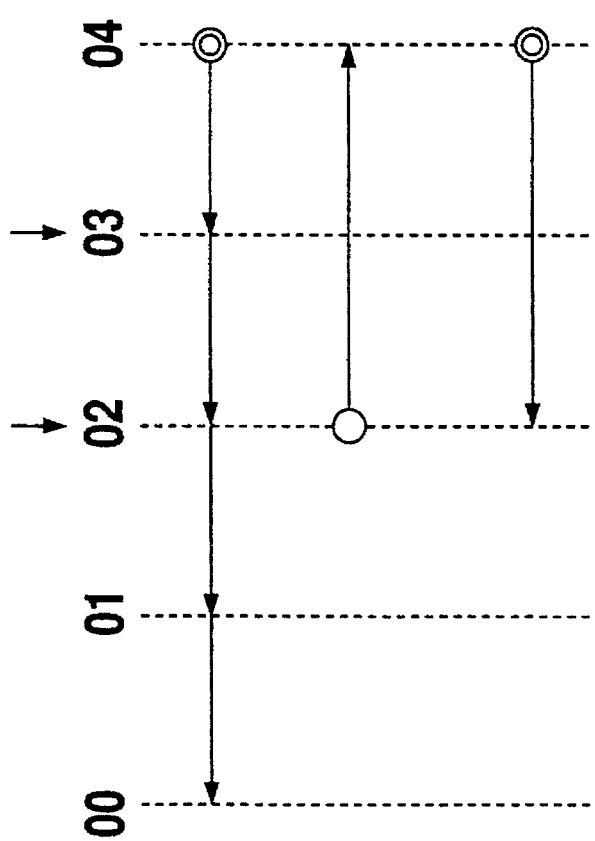
FIG. 7 is a schematic view showing an operation of a solicit process against other stations when the solicit process is normally executed without any collision of set successors in the embodiment shown in FIG. 2.

In FIG. 7, ⊙, ○ and ↓ represent a transmission from a token hold station, a transmission from other stations holding no token i.e. a response against a solicitation, and a station requesting participation in the logical ring 12, respectively (the same as in the following figures). As shown in FIG. 7, when the station 04 transmits the solicit _successor_1 with SA=04 and DA=01, the two stations 02 and 03 locating in the window can respond. The two stations 02 and 03 set their own contention_timers at random. The contention_timer is a timer for preventing a contention of responses from a plurality of stations. In the example shown in FIG. 7, the contention_timers of the two stations 02 and 03 are set by 0 ms and 4 ms, respectively. Thus, in this case, the contention_timer of the station 02 expires earlier (immediately in this case) than that of one 03. Hence, the station 02 transmits the set _successor directed to the station 04 earlier than the station 03. The station 03 confirms by the receive that the station 02 has already transmitted the set _successor directed to the station 04 and abandons the transmission directed to the station 04. The station 04 transmits the token to the station 02 when the response_window_timer expires again.

Figure 8:
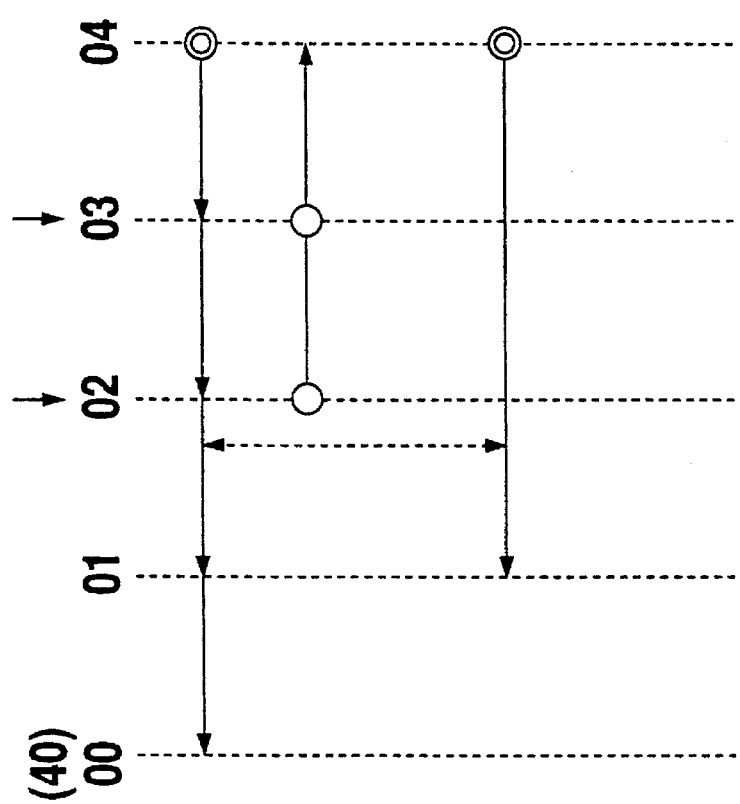
FIG. 8 is a schematic view showing an operation of a solicit process against other stations when set _successors collide with each other during the solicit process executed in the embodiment shown in FIG. 2.

Further, as shown in FIG. 8, in a case where the same time is set by chance in the contention_timers of the stations 02 and 03, the set _successor directed from the station 02 to the station 04 coincides with the set _successor directed from the station 03 to the station 04 and hence the station 04 can receive none of the set _successors correctly. As a result of responding using the set _successor, the two stations 02 and 03 falls into a state of awaiting token. In the response_window_timer, a predetermined value such as 8 ms is set at the transmission of the solicit _successor and, when receiving no set _successor from the two stations 02 and 03, the response_window_timer expires. At this time, the station 04 abandons the solicitation against the stations 02 and 03. Thereafter, the station 04 transmits another solicit _successor having a widened window and transmits the token to, for example, the station 01 which answered that. The stations 02 and 03 receive the token directed to another station and hence abandon the joining into the logical ring 12 to await a next opportunity.

Figure 9:
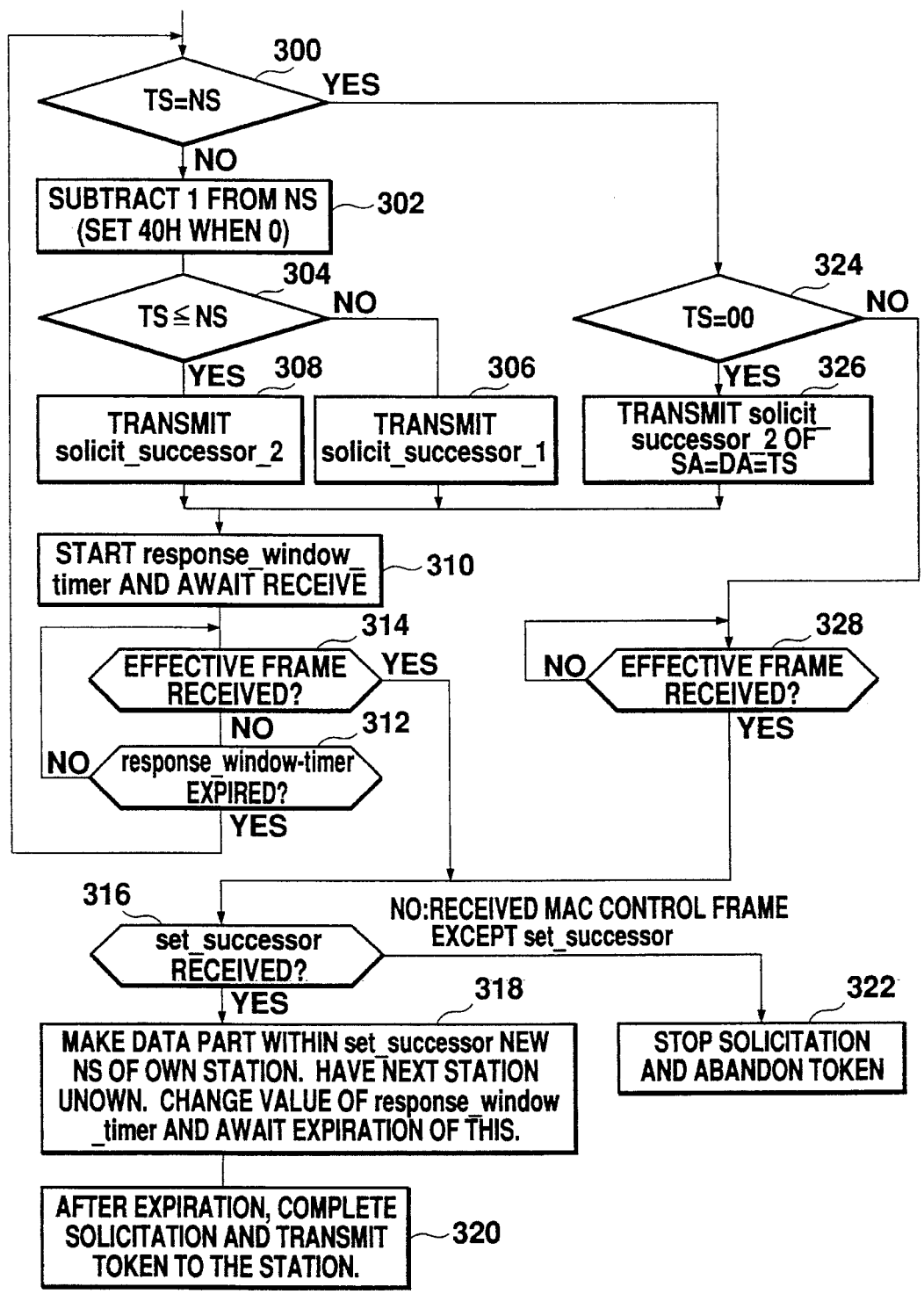
FIG. 9 is a flow chart of a solicit _successor procedure executed at an initial time or when a next station is lost in the embodiment shown in FIG. 2.

For realizing such an operation, FIG. 9 shows the solicit _successor procedure to be executed by the token hold station when a next station is unknown.

In this procedure, first, the communication controller discriminates whether TS=NS or not in step 300. Right after obtaining the token by the claim _token, in the main station, TS≠NS. In the station which fails in sending of the token again and further receives no response to the who _follows, since the station code of the next station is theretofore set in NS, also TS≠NS. Accordingly, just after the solicit _successor procedure starts when the next station is unknown, the operation proceeds from step 300 to step 302.

In step 302, NS is subtracted by one. However, when 00H is obtained as the subtraction, the maximum station code (40H in the case of 64 stations) is set to NS. Further, when TS>NS in step 304, the solicit _successor_1 is transmitted in step 306, or when TS≦NS in step 304, the solicit _successor_2 is transmitted in step 308. After sending the solicit _successor_1 or the solicit _successor_2, the token hold station sets the predetermined value such as 8 ms in this example to the response_window_timer and starts this timer in step 310. The token hold station then waits until the response_window_timer expires in step 312.

In the case where any station desiring to join in the logical ring 12 is present in the window of the solicit _successor_1 or the solicit _successor_2, as long as no collision occurs in the set _successors, as shown in FIG. 8, the token hold station can receive the set _successor directed to itself before the response_window_timer expires. When receiving an effective frame before the response_window_timer expires in step 314, the token hold station discriminates whether or not the received frame is the set _successor in step 316. When it is discriminated that the received frame is the set _successor in step 316, the token hold station sets the station code of the station which transmitted the station code included in the set _successor as the data or the set _successor, sets the response_window_timer and further waits until this timer expires in step 318. After the timer expires, the token hold station finishes the solicit process and transmits the token to the station indicated by NS in step 320. On the other hand, when it is discriminated that the received frame is not the set _successor in step 316, the token hold station stops the solicit process and abandons the token in step 322.

In turn, when the token hold station cannot receive the response against the solicit _successor_1 or the solicit _successor_2 transmitted in step 306 or 308 before the response_window_timer expires in step 312, the operation returns to step 300, that is, as long as TS≠NS in step 300, NS is subtracted by one in step 302 and the solicit _successor_1 or the solicit _successor_2 is transmitted again in step 306 or 308. In other words, by subtracting one by one from NS, the window of the solicit _successor_1 or the solicit _successor_2 is extended one by one and thus the stations which cannot hitherto respond will turn out to be able to respond in order.

When disregarding such a repetition of the transmission, the token hold station cannot receive the response at TS=NS in step 300, the operation moves to step 324. That is, when the token hold station cannot receive the response by the frame such as the set _successor even in the state that the window of the solicit _successor_1 or the solicit _successor_2 is extended to the maximum, the token hold station discriminates whether to be a main station or a sub station (TS=00 (=40H) or not) in step 324. When it is the main station, that is, in the case of the solicit _successor procedure after obtaining the token by the claim _token transmission, the solicit _successor_2 of SA=DA=TS, that is, the solicit _successor intended for all the stations is transmitted in step 326 and the operation then moves to step 310. On the other hand, when it is the sub station, the transmission of the solicit _successor is no longer executed. In this case, the token hold station reverts to the idle state until receiving the effective frame in step 328. When the token hold station receives the effective frame, the operation proceeds to step 316.

As described above, in this embodiment, the solicitation by the main station goes on until another station answers. In contrast, the solicitation by the sub station ends at the time when the object of the solicitation is extended to the maximum. Further, the solicitation cannot be answered all together by all the stations like the IEEE 802.4 and hence the load of the receive art in each station can be reduced.

b. 1. 2) Solicit _successor procedure when a next station is known.

Figure 10:
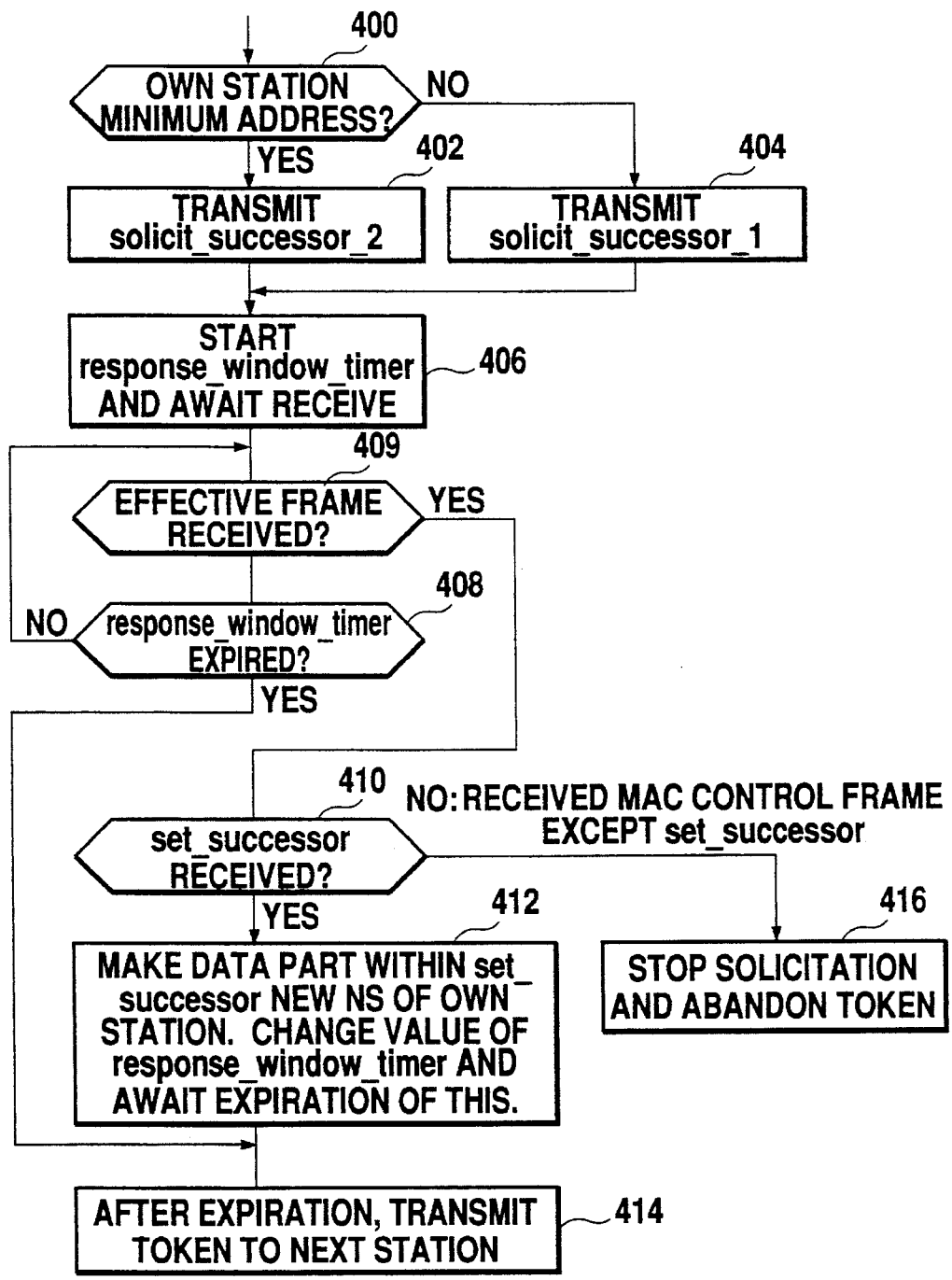
FIG. 10 is a flow chart of a solicit _successor procedure executed at a maintenance of a logical ring when a next station is known in the, embodiment shown in FIG. 2.

FIG. 10 illustrates a solicit _successor procedure when a next station is known. This solicit _successor procedure is performed when maintenance of the logical ring 12 is required, for example, when the station code of itself is discontinuous from that of the next station. That is, this is the solicit _successor procedure for confirming the next station.

In this solicit _successor procedure, first, the token hold station discriminates whether or not to have the minimum address (station code) within the stations joined in the logical ring 12 in step 400. When it is the minimum address, the token hold station transmits the solicit _successor_2 to the next station in step 402, or when it is not the minimum address, the solicit _successor_1 in step 404. Then, the token hold station sets the response___window_timer to a predetermined value such as 8 ms in this case and then starts this timer in step 406. When the token hold station does not receive the effective frame in step 409, the operation proceeds to step 408. When the token hold station receives the effective frame from the next station in step 409 before the response_window_timer expires in step 408, if the received frame is the set _successor in step 410, the token hold station executes a processing in the same manner as step 318 in step 412 and further transmits the token to the next station in step 414. In step 408, when the response_window_timer expires, the operation immediately moves to step 414. In step 410, when the token hold station receives the MAC control frame except the set _successor before the response_window_timer expires, the token hold station stops the solicit _successor procedure and abandons the token in step 416.

b. 2) Token passing procedure:

In this embodiment, after obtaining the token, the station executes the solicit _successor procedure of the unknown next station once per predetermined number of times and sends the token to the stations which respond to that by the set _successor. In the case where the station having responded to the solicit _successor has already joined in the logical ring 12 before the response, it is considered that there is no station wishing to join in the logical ring 12 and the solicit process will not be carried out for a predetermined period. In the state that the logical ring 12 is established in such a progress as described above, the logical ring 12 is maintained by the token passing.

Figure 11:
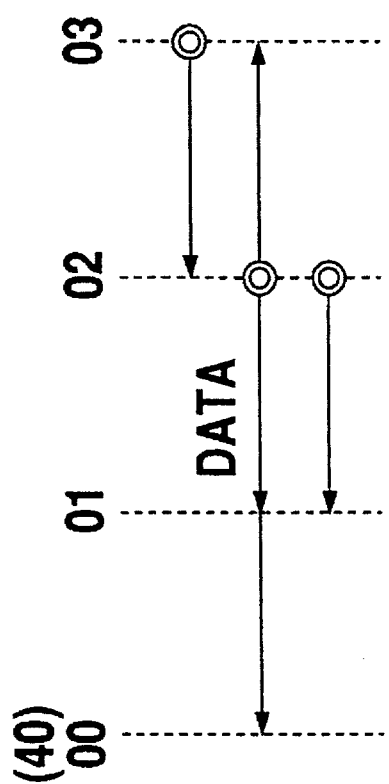
FIG. 11 is a schematic view showing an operation of a token passing executed when a token transmission succeeds in the embodiment shown in FIG. 2.

The token passing is a procedure executed at the time when the station holding the token as the transmission right of data transmits the token to other stations. For example, as shown in FIG. 11, the station 03 holds the token. Now, the case where the token is transmitted from the station 03 to the next station 02 will be considered. In this case, the station 03 not only starts the token _pass_timer but transmits the token to the station 02. The station 02 receives the token and, if there is any data to be transmitted, the station 02 sends the data. Thereafter the station 02 delivers the token to the next station. In a case where a plurality of stations responding to the solicit _successor are present, the token hold station executes a predetermined process as follows. That is, when a plurality of stations respond at the same time, this is ignored and, when the corresponding station is single, the token can be transferred, as described above. Off course, like the IEEE 802.4, it is possible to execute a process by which the token is sent to the nearest one in the transferring direction of the logical ring. The station 03 confirms that the effective MAC control frame is transmitted by the station 02, as described above, and judges that the token passing is completed.

Figure 12:
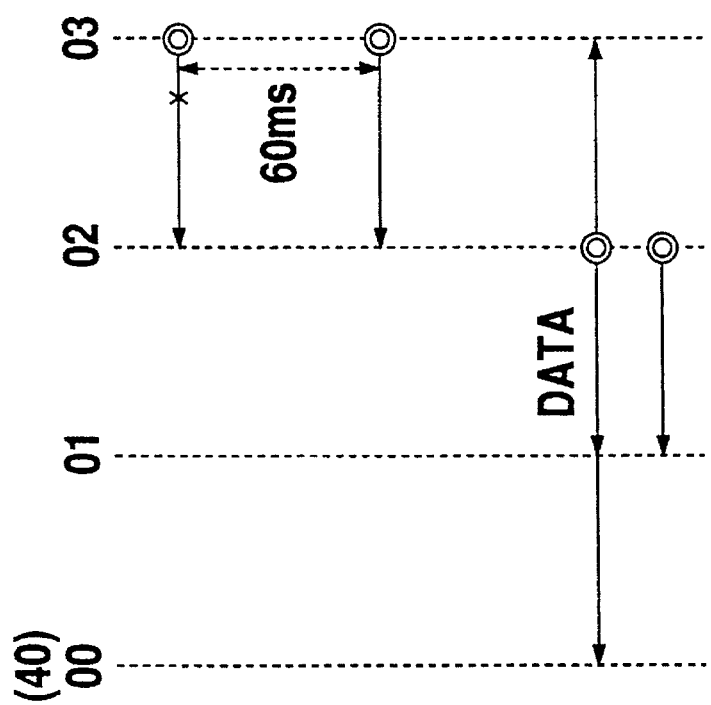
FIG. 12 is a schematic view showing an operation of a token passing executed when a first token transmission fails and a next token transmission succeeds in the embodiment shown in FIG. 2.

Further, as shown in FIG. 12, when the token sent from the station 03 is broken down by noise or the like, since the next station 02 cannot receive the token, the station 03 transmits the token again after the token _pass_timer expires. In this embodiment, the token _pass_timer expires in 60 ms. When it is confirmed that the token transmitted again is received by the station 02 in the same manner as described above, the station judges that the token passing is finished.

Figure 13:
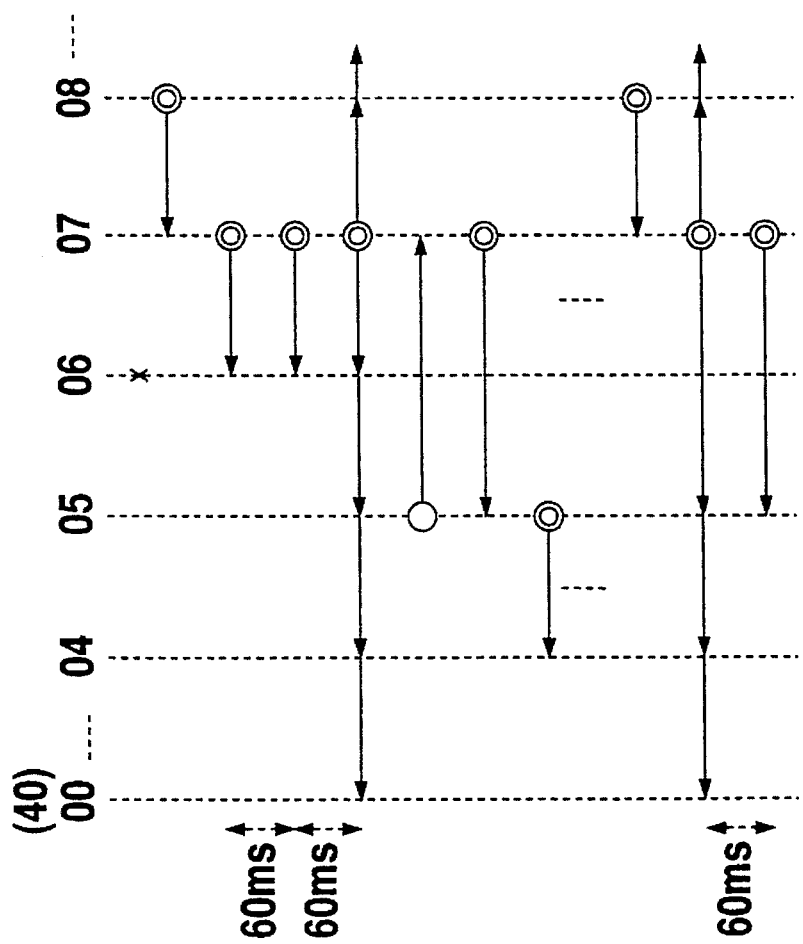
FIG. 13 is a schematic view showing an operation of a token passing executed when a second token transmission also fails in the embodiment shown in FIG. 2.

Moreover, as shown in FIG. 13, when a station 06 is cut off from the bus or its power source falls off, the sending again of the token from a station 07 to the station 06 does not succeed. In this case, it can be said that the station 07 has the state to have lost the next station. The station 07 transmits the who _follows as the frame including codes of its own station code and the next station. The station capable of responding to the who _follows is the next station of the next station included in the who follows, that is, the station 05 in this case, as shown in FIG. 13. When the response is sent from this station 05 by the set _successor, the token hold station 07 transmits the token to the station 05. Further, when the token reaches the station 07 after predetermined times of circulation, the station 07 solicits the station 06 by the solicit _successor_1. If there is no response at this time, the station 07 transmits the token to the station 05.

Figure 14:
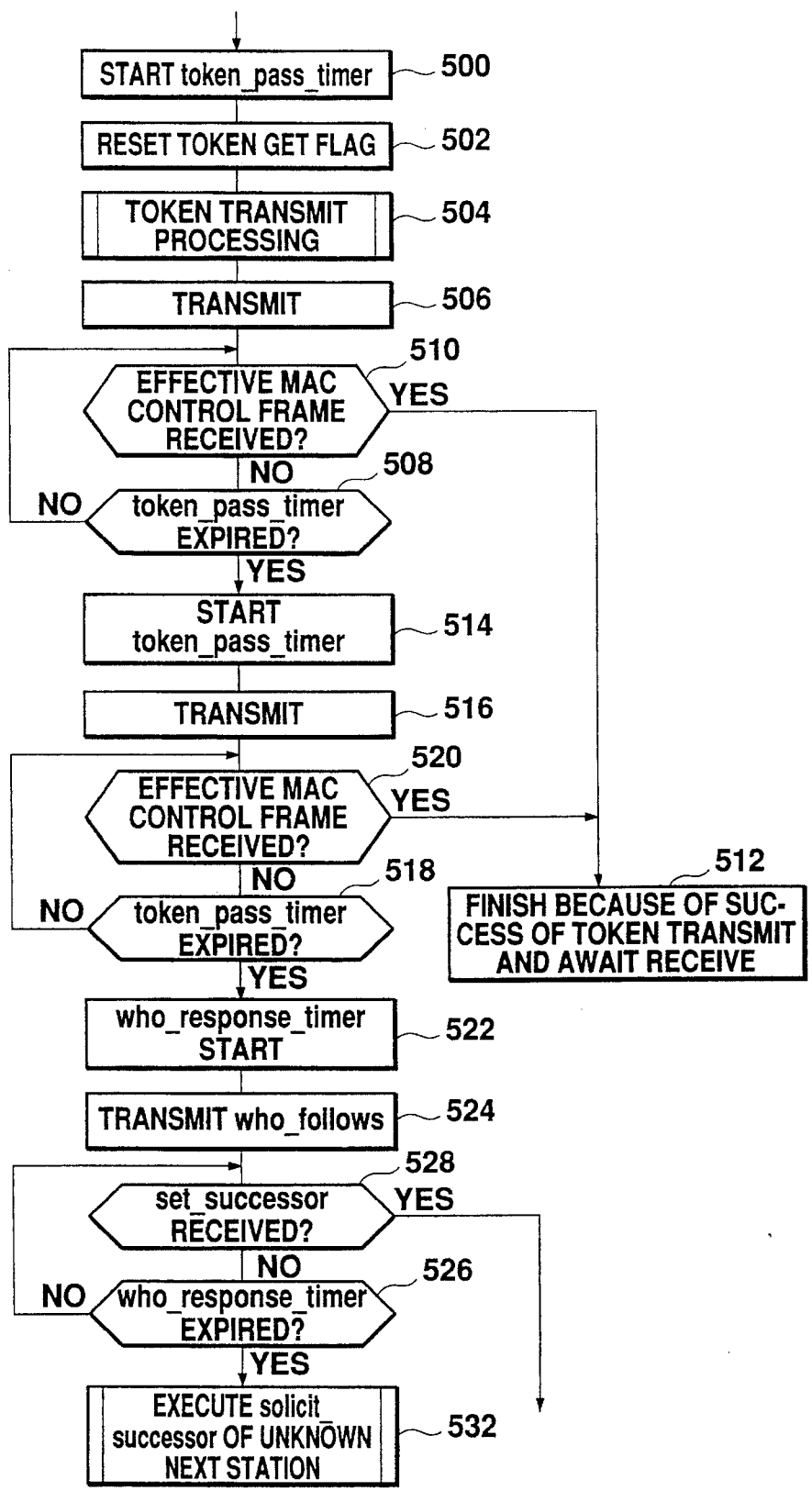
FIG. 14 is a flow chart of a token passing procedure executed in the embodiment shown in FIG. 2.

FIG. 14 shows the token passing procedure.

In this procedure, first, a token _pass_timer is started in step 500. In this embodiment, the token _pass_timer is determined to 60 ms. Next, a token get flag is reset in step 502, a token transmission processing is executed in step 504, and further the token is transmitted in step 506.

When the token hold station receives the effective MAC control frame in step 510 before the token _pass_timer expires in step 508, the token hold station considers that the token transmission succeeds and moves to the receive awaiting state in step 512. Further, when the token _pass_timer expires without receiving the effective MAC control frame, the token _pass___timer is started again in step 514 and further the token is transmitted in step 516. When the token hold station receives the effective MAC control frame in step 520 before the token _pass_timer expires in step 518, the token hold station considers that the token transmitted again succeeds and moves to the receive awaiting state in step 512.

When also failing in sending the token again, that is, when the token _pass_timer expires in step 518 without receiving the effective MAC control frame, the who _response_timer is started in step 522 and further the who _follows is transmitted in step 524. When the token hold station receives the set _successor in step 528 before the who _response _timer follows timer expires in step 526, the station having transmitted this set _successor is dealt with as the next station. In contrast, when the who _response _timer expires, the solicit _successor procedure of the unknown next station is performed in step 532.

c) Operation at power on:

Next, of operations of the network realized by the aforementioned procedures, an operation at power on will now be described.

Figure 15:
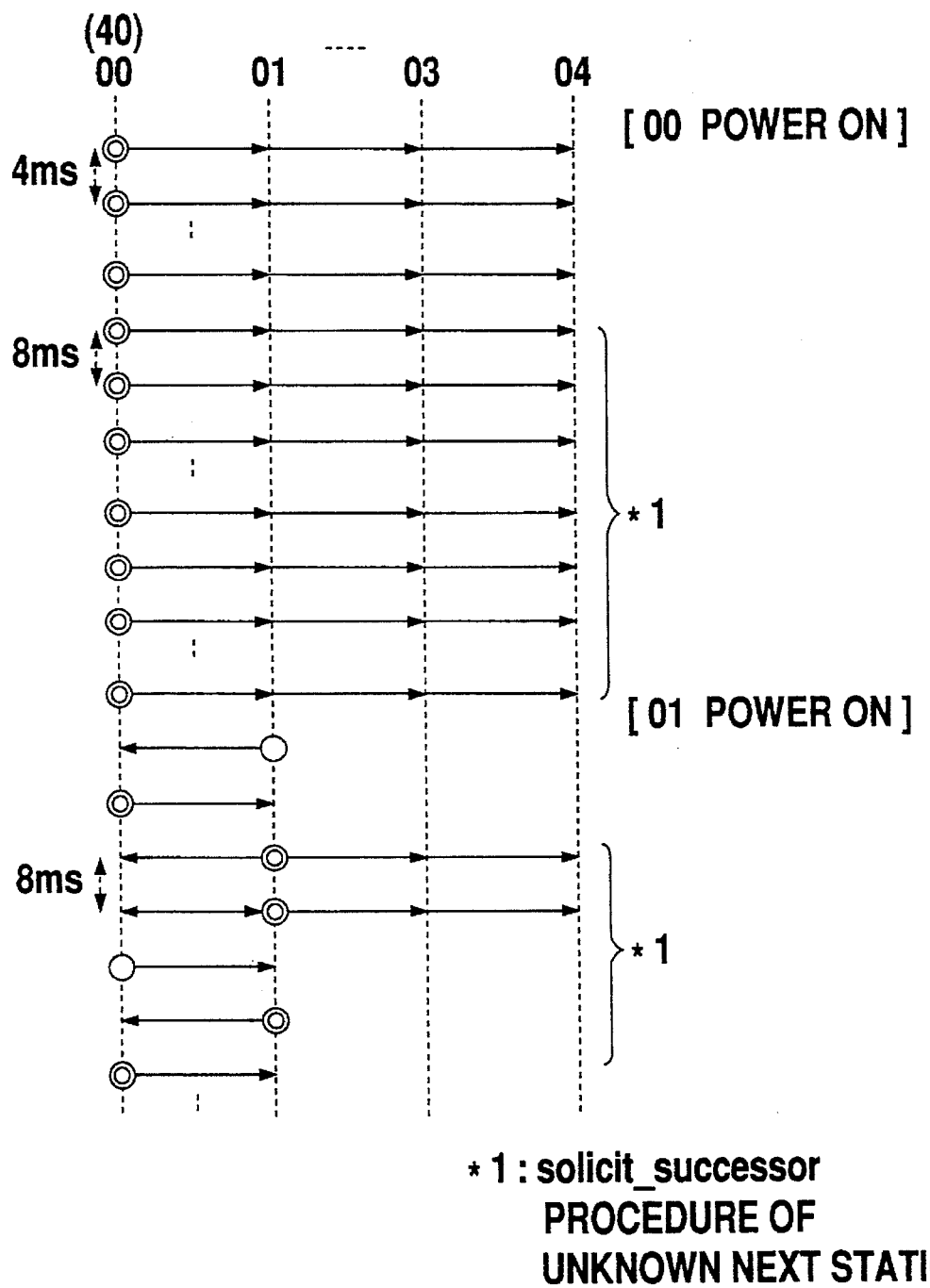
FIG. 15 is a schematic view showing an operation from power , on in a particular station 40 to establishing of the logical ring to which a station 01 joins in the embodiment shown in FIG. 2.
Figure 16:
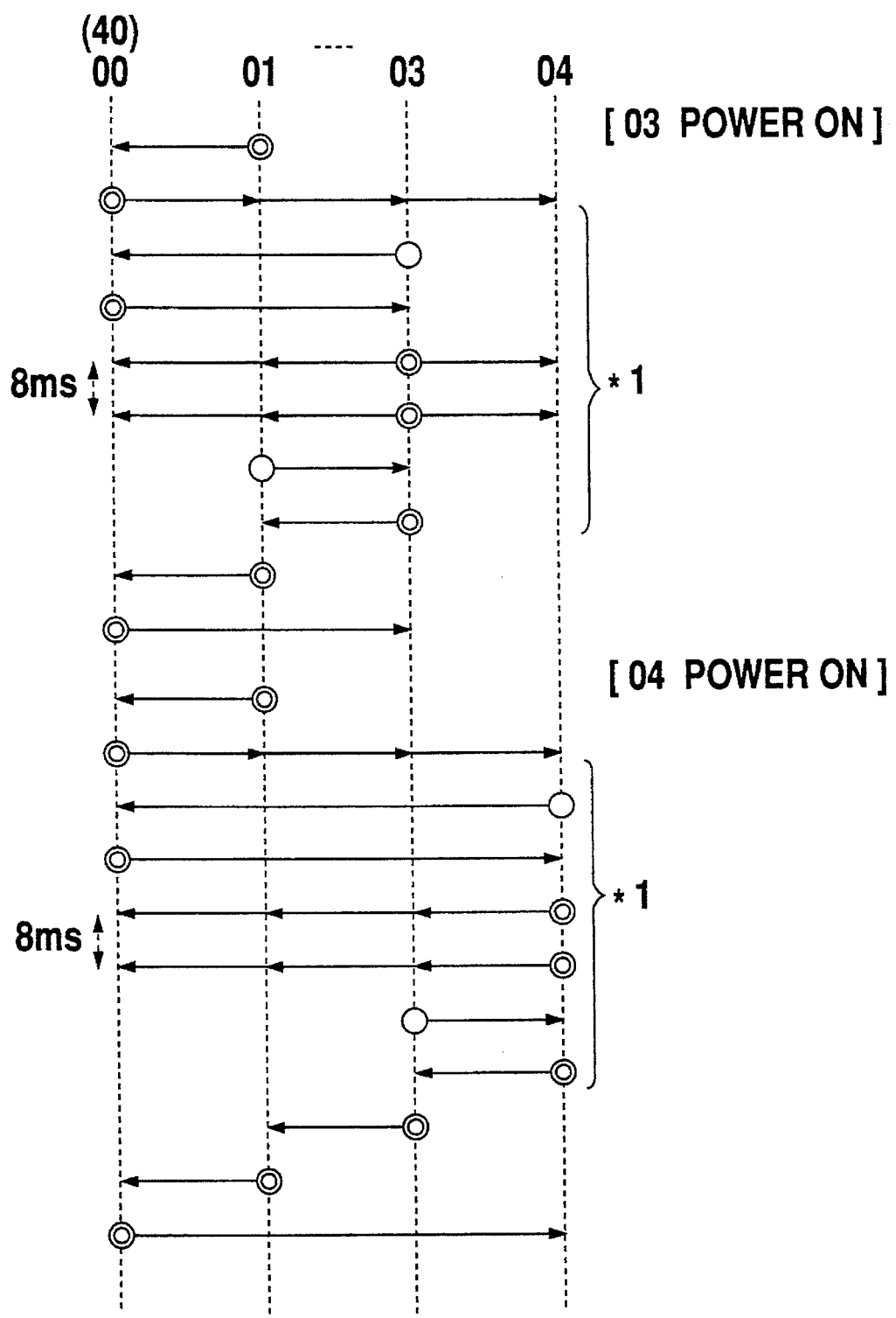
FIG. 16 is a schematic view showing an operation from power on in a station 03 to establishing of the logical ring to which the stations 03 and 04 joins in the embodiment shown in FIG. 2.

Now, it is assumed that the number of stations constituting the network is 64 and a main station is given with the station code 00=40H. In this case, first, the main station 00 (40H) is turned on and then other stations 01, 03 and 04 are turned on in the order of 01→03→04. FIG. 15 and FIG. 16 show the operations of the network, particularly the operations concerning a transmit-receive of the MAC control frame for establishing and maintaining the logical ring 12.

As shown in FIG. 15, after switching on, first, the main station 00 transmits the claim _token a predetermined number of times such as 8 times. This transmission is carried out at a predetermined time interval such as 4 ms. The main station 00 obtains the token by executing this procedure.

After obtaining the token by transmitting the claim _token predetermined number of times, first, the main station 00 performs the solicit _successor procedure of the unknown next station. That is, the main station 00 not only confirms whether there is any station which is turned on to be capable of participating in communication except the main station but executes the solicit _successor procedure so as to solicit the station or stations confirmed for joining in the logical ring 12. In this case, since the station code of the station for transmitting the solicit _successor is 40H, TS≧NS is always satisfied in step 304, as described above, and the solicit _successor to be transmitted is the solicit _successor_1.

The main station 00 extends the window of the solicit _successor_1 gradually. That is, in the main station 00, TS=40 and NS=3F are set right after the power on and the window is extended one by one in step 302 as follows: For example, SA=40 and DA=3F at the first solicit _successor_1 to be transmitted; SA=40 and DA=3E at the second solicit _successor_1; . . . If none of the other stations are switched on by the maximum extension of the window, no response to the solicit _successor_1 sent by the main station 00 is transmitted and hence the main station 00 repeatedly executes step 326. That is, the solicit _successor_2 whose window is extended to the maximum is transmitted until any of the other stations answer. In this case, the transmission of the solicit _successor_1 or the solicit _successor_2 from the main station 00, that is, the solicitation of other stations is executed at an expiry time interval such as 8 ms (in this figure) of the response_ window_timer.

Later, the power source of the station 01 is switched on at a certain time point. The station 01 responds to the Solicit _successor_1 or the solicit _successor_2 sent from the main station 00 by the set _successor. The main station 00 transmits the token to the station 01 in response to this. The station 01 having received the token directed to itself first executes the solicit _successor procedure of the unknown next station and solicits other stations except itself for joining in the logical ring 12. In the station 01, since TS=01 and NS=40 are set just after the power on, the solicit _successor to be first transmitted is the solicit _successor_2 of SA=01 and DA=40 and next the solicit _successor to be secondly transmitted is the solicit _successor_2 of SA=01 and DA=3F. Against the solicit _successor_2 of SA=01 and DA=3F, only the main station 00 can respond. When the main station 00 responds by the set _successor, the station 01 transmits the token to the main station 00. In this way the logical ring 12 can be established by the stations 00 and 01 switched on.

The main station 00 transmits the solicit _successor_1 of SA=40 and DA=NS at a fixed period, for example, every 256 rounds of the token. That is, the state of the network is monitored so as to allow the stations to join in the logical ring 12 if some stations capable of joining in the communication are present in a range of 40 to NS.

As shown in FIG. 16, assuming that the power source of the station 03 has been turned on at a certain time point, when receiving the solicit _successor_1 of SA=40 and DA=NS sent from the main station 00 at the fixed period, the station 03 transmits the set _successor to the main station 00. In response to this, the main station 00 transmits the token to the station 03. When receiving the token directed to itself, the station 03 first executes the solicit _successor procedure of the unknown next station in response thereto. In this solicit _successor procedure, first the solicit _successor_1 of SA=03 and DA=01 and secondly the solicit _successor_2 of SA=03 and DA=40 are transmitted. Of the power on stations, the station 01 can answer the solicit _successor_2 of SA=03 and DA=40. Hence, the station 01 responds to this by the set _successor, and thus in response to this the station 03 transmits the token to the station 01. In this manner, the station 03 joins in the logical ring 12 and the token is circulated among the stations in the order of 03→01→40→03 . . .

Figure 17:
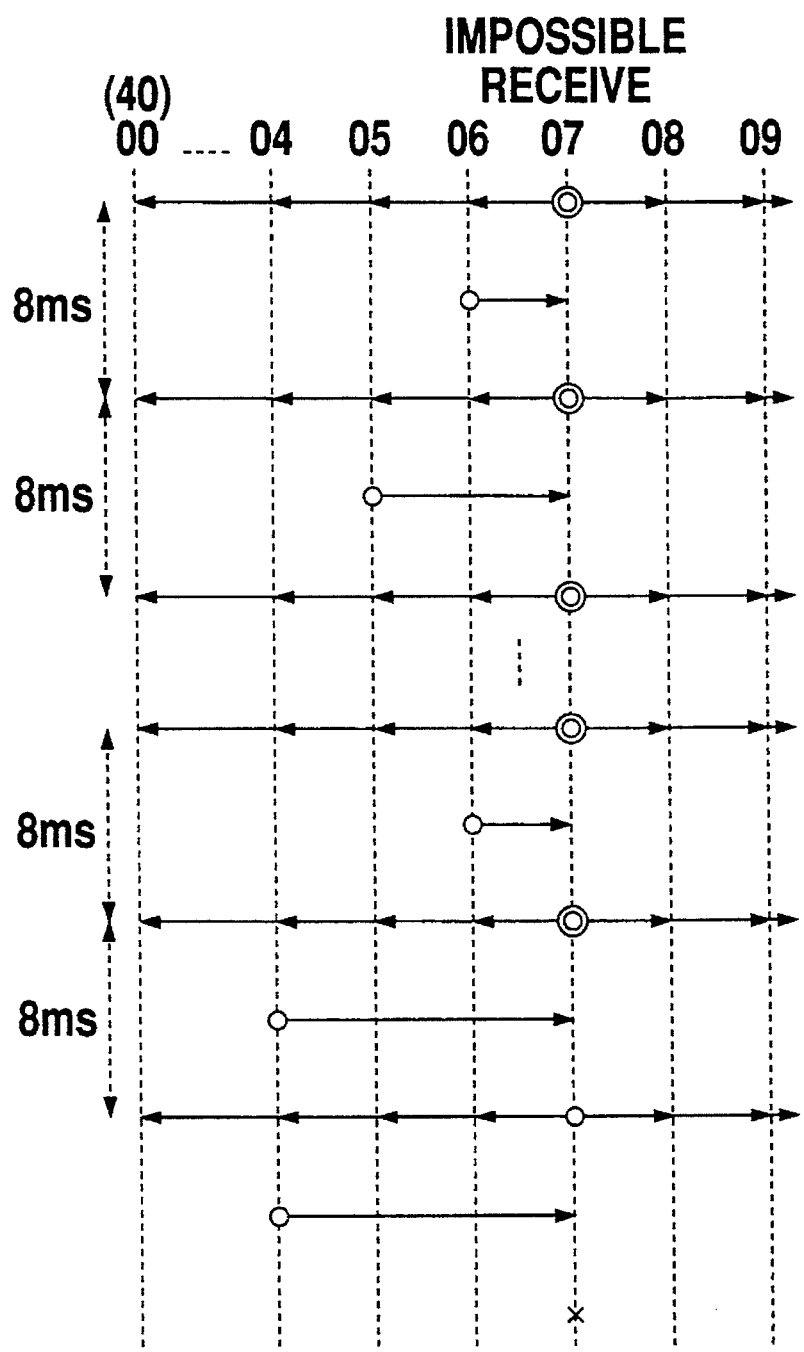
FIG. 17 is a schematic view showing a communication operation when a token hold station 07 falls into a transmit-possible and receive-impossible state in the embodiment shown in FIG. 2.

Further, assuming that the power source of the station 04 is switched on at a certain time point, when receiving the solicit _successor_1 of SA=40 and DA=NS periodically transmitted from the main station 00, the station 04 transmits the set _successor to the main station 00. Then the main station 00 responds to this to send the token to the station 04. When receiving the token directed to itself, thus the station 04 first carried out the solicit _successor procedure of the unknown next station. In this solicit _successor procedure, first the solicit _successor_1 of SA=04 and DA=03 and secondly the solicit _successor_1 of SA=04 and DA=02 are transmitted. Of the power-on stations, the station 03 can respond to the solicit _successor_1 of SA=04 and DA=02. Accordingly, the station 03 answers by the set _successor, and the station 04 responds to this to transmit the token to the station 03. As described above, the station 04 joins in the logical ring 12 and the token circulates among the stations in the order of 04→03→01→40→04 . . .

d) Operation when a sub station falls into a transmit-possible and receive-impossible state:

FIG. 17 illustrates an operation when a problem occurs in a part of a communication function of a sub station which is holding the token such as a station 07 and the sub station falls into a transmit-possible and receive-impossible state.

In this case, even when the station 07 executes the solicit _successor procedure of the unknown next station, the station 07 cannot receive the set _successor directed to itself and hence the range of the stations as the objects of the set _successor is gradually extended and turns out to satisfy the condition of step 300 at a certain time point. At this time, the station 07 stops the solicitation and proceeds to the state of awaiting the effective frame.

Since the station 07 holds the token at this time, the communication in the network temporarily goes quiet. In this embodiment, in such a case, in the same manner as at the above power on, the claim _token is transmitted by another station such as the main station 00 and the main station 00 produces the token by itself. The main station 00 then executes the solicit _successor procedure of the unknown next station like at the power on. The station which is included in the window and received the solicit _successor except the main station 00 responds to the main station 00 by the set _successor. The main station 00 transmits the token to the responded station.

Figure 18:
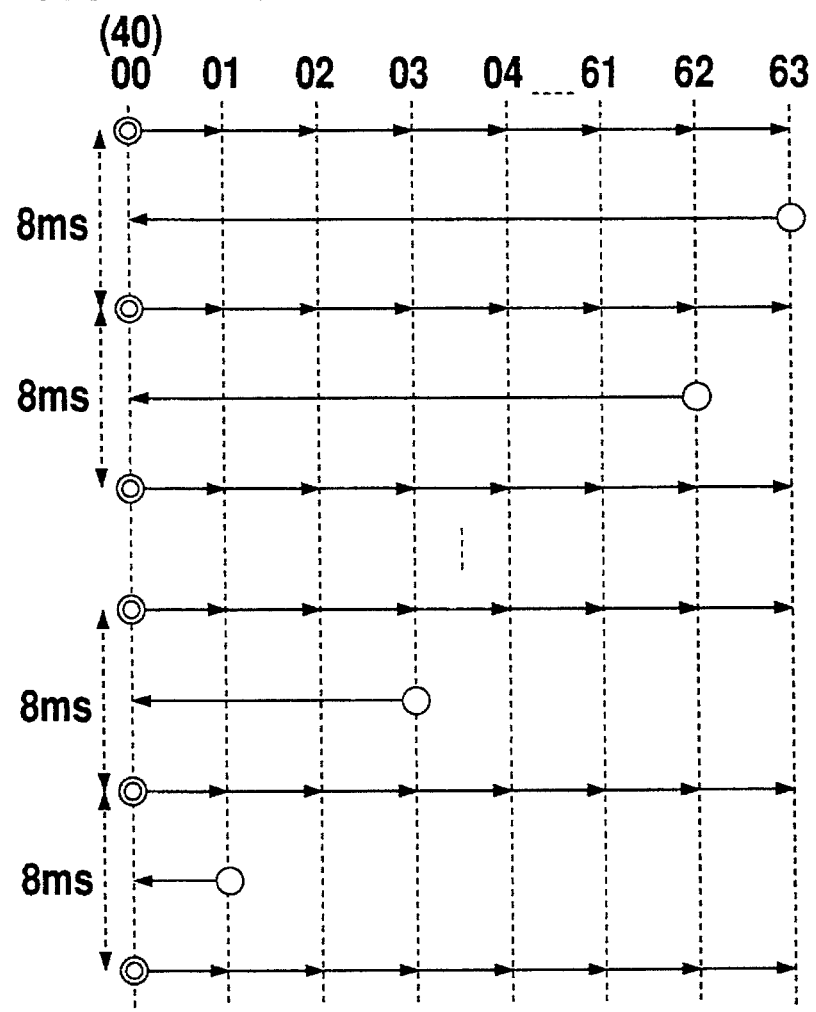
FIG. 18 is a schematic view showing a communication operation when the token hold station 40 falls into a transmit-possible and receive-impossible state in the embodiment shown in FIG. 2.

That is, in tills embodiment, when the sub token hold station such as the station 07 encounters problems such as falling into the transmit-possible and receive-impossible state, the solicit process by the token hold station is stopped at the certain time point. Further, thereafter, the token is produced by the main station 00 and the logical ring 12 can be established again. Hence, a manual reset required in the IEEE 802.4 is not necessary. Further, after obtaining the token by the claim _token transmission, the former token hold station such as the sub station 07 cannot respond to the solicit _successor sent from the main station 00. Hence, the station falling into the transmit-possible and receive-impossible state is automatically removed from the logical ring 12 and thus the faulty station can be readily specified.

e) Operation when a main station falls into a transmit-possible and receive-impossible state:

FIG. 18 shows an operation when a problem occurs in a part of a communication function of the main station 00 which is holding the token and the main station 00 falls into a transmit-possible and receive-impossible state.

In this embodiment, different from the case of the sub station, the solicit _successor procedure is not stopped even when the window is extended to the maximum and the transmission of the solicit _successor_2 to all the stations is repeatedly and continuously carried out.

As described above, according to the present invention, although a station, except a particular station (e.g. main station 00), repeatedly executes the transmission of solicitation up to a predetermined number of times, when the station cannot receive any response to its solicitation, the station moves-to the state of awaiting the transmission directed to itself. Further, even when none of other stations join in the communication, the particular station can produce the token by itself and execute the transmission of solicitation. Hence, when a token hold station, except the particular station, encounters a problem, such as falling into a transmit-possible and receive-impossible state, the particular station can produce the token and establish the logical ring again and hence the network can automatically return to the communication state. Further, the station falling into the transmit-possible and receive-impossible state cannot return from the awaiting state. Hence, the trouble can be effectively specified and the troubled station can be readily removed from the logical ring.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. A communication network including a plurality of stations which constitute a logical ring to transmit and receive information, the logical ring being a single path and being established and maintained by a token passing process to pass the token, representing the right to transmit information, between the stations in the logical ring and a solicit process to solicit stations which are not in the logical ring, and the stations in the network including at least one particular station, each of the stations as well as the particular station, comprising:

solicit means for carrying out the solicit process when holding a token;

solicit response means for transmitting a frame to respond to the solicit process carried out by any station in the network; and token transmit means for transmitting the token to the station having transmitted a frame to respond to the solicit process, when holding the token;

each station except for the particular station further comprising:

first solicit repeat means for repeating the solicit process at most a predetermined number of times when no frame arrives from other stations in the network to respond to the solicit process, when holding the token;

idle state move means for considering that no other stations join in the logical ring when no frame to respond to the solicit process arrives until the solicit process is repeated for the predetermined number of times, and for moving to an idle state to await the arrival of a frame from any station in the network; and return means for resuming a predetermined operation from the idle state by responding to an effective frame arriving from any station in the network;

the particular station further comprising:

second solicit repeat means for repeating the solicit process when no frame arrives from any station in the network in response to the solicit process executed by the particular station; and token producing means for producing the token when no other station joins in the logical ring.

2. A communication method for carrying out communication among a plurality of stations joining in a logical ring which is a single path and which is established and maintained by a token passing process to pass the token, representing the right to transmit information, between the stations in the logical ring and a solicit process to solicit stations which are not in the logical ring, the communication method comprising:

a solicit step for letting the solicit process be carried out by a station which is currently holding the token;

a solicit response step for transmitting a frame from another station to the current token-holding station;

a token transmit step for transmitting the token from the current token-holding station to said another station when the current token-holding station receives the frame in response to the solicit process carried out thereby;

a first solicit repeat step for enabling the current token-holding station to repeat the solicit process at most a predetermined number of times when the current token-holding station cannot receive a frame from any station in the network in response to the solicit process carried out by the current token-holding station which is not a particular station;

idle state move step for considering that no other stations join in the logical ring when no frame arrives to respond to the solicit process carried out by the current token-holding station other than the particular station until the solicit process is repeated for the predetermined number of times, and for moving to an idle state to await the arrival of a frame from any station responsive to the solicit process;

a return step for responding to an effective frame arriving from any station in the network and for enabling the station, which is the token holding station but not the particular station, to resume a predetermine operation;

a second solicit repeat step for repeating the solicit process when the particular station is currently holding the token and when no frame arrives from any station in the network in response to the solicit process; and a token producing step for permitting the particular station to produce the token when no other station joins in the logical ring.

* * * * *

UNITED STATES PATENT AND TRADEMARK OFFICE
CERTIFICATE OF CORRECTION

PATENT NO. : 5,600,796
DATED : Feb. 4, 1997
INVENTOR(S) : Naoki Okamura et al.

It is certified that error appears in the above-indentified patent and that said Letters Patent is hereby corrected as shown below:

| Column | Line | |
|---|---|---|
| 5 | 38 | After "power" delete ",". |
| 8 | 17 | Change "f-or" to --for--. |
| 9 | 47 | Change "0 ms and 4 ms" to --0 ms and 4 ms-- |
| 15 | 19 | Change "tills" to --this--. |
| 15 | 26 | Change "802.4" to --802.4--. |

Signed and Sealed this

Twentieth Day of May, 1997

Attest:

BRUCE LEHMAN

*Attesting Officer*  *Commissioner of Patents and Trademarks*